May 18, 1926.
T. S. MILLER ET AL
1,585,162
HOISTING AND CONVEYING DEVICE
Filed August 10, 1922  3 Sheets-Sheet 1
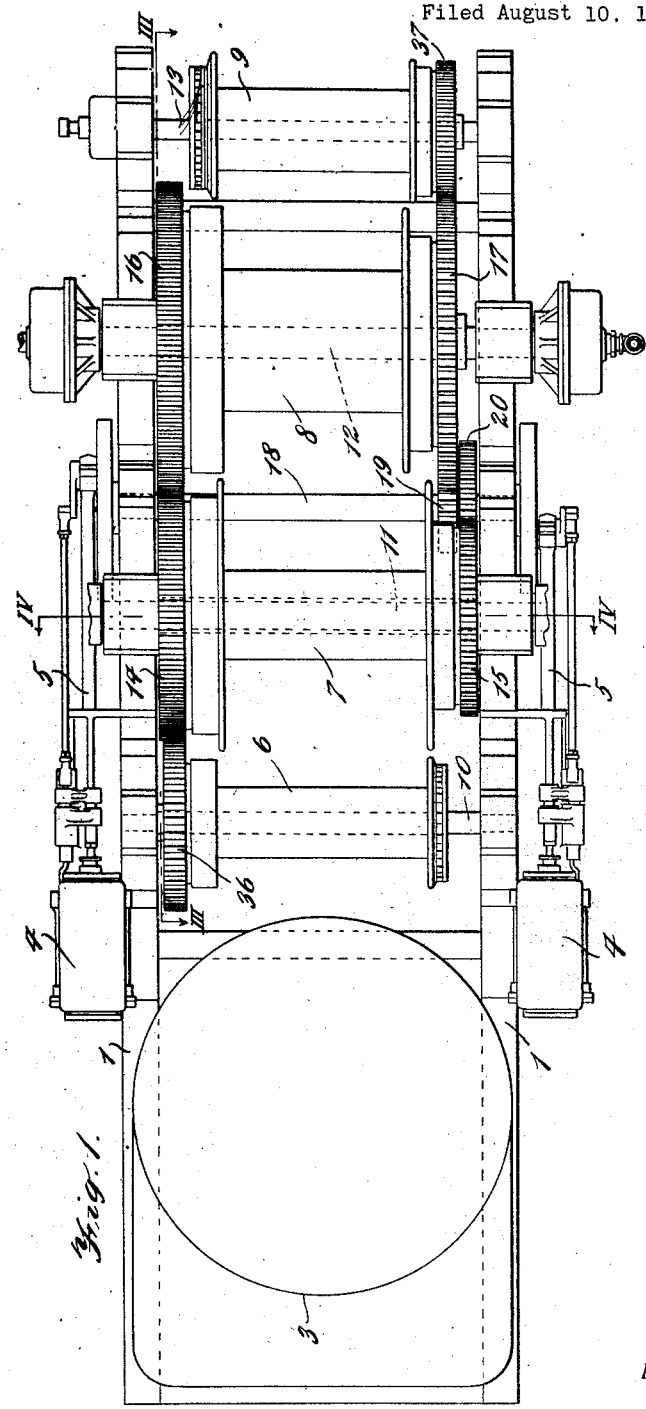
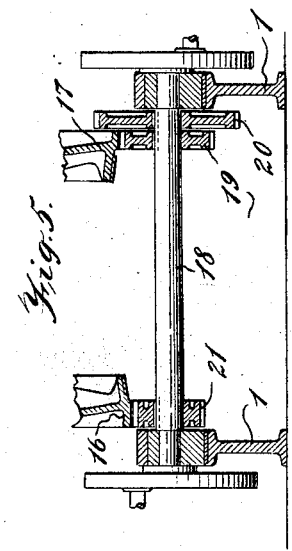
INVENTORS.
Thomas Spencer Miller
BY Joseph H. Dickinson
Giffard, Ball & Hull
Their ATTORNEYS.

May 18, 1926.
T. S. MILLER ET AL
HOISTING AND CONVEYING DEVICE
Filed August 10, 1922   3 Sheets-Sheet 2
1,585,162
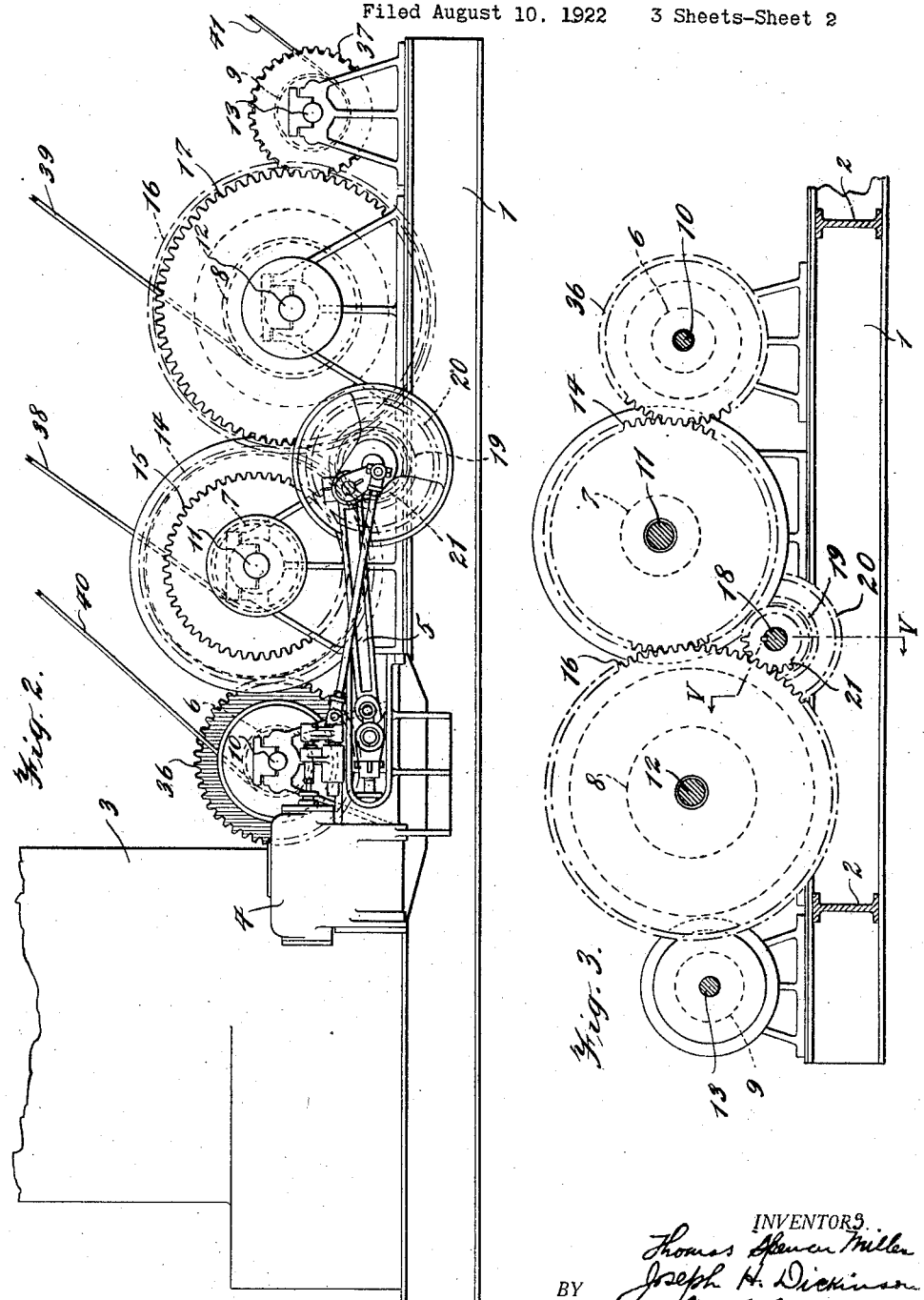
INVENTORS.
Thomas Spencer Miller
Joseph H. Dickinson
BY Gifford, Bull & Scull
Their ATTORNEYS.

May 18, 1926.
T. S. MILLER ET AL
1,585,162
HOISTING AND CONVEYING DEVICE
Filed August 10, 1922   3 Sheets-Sheet 3
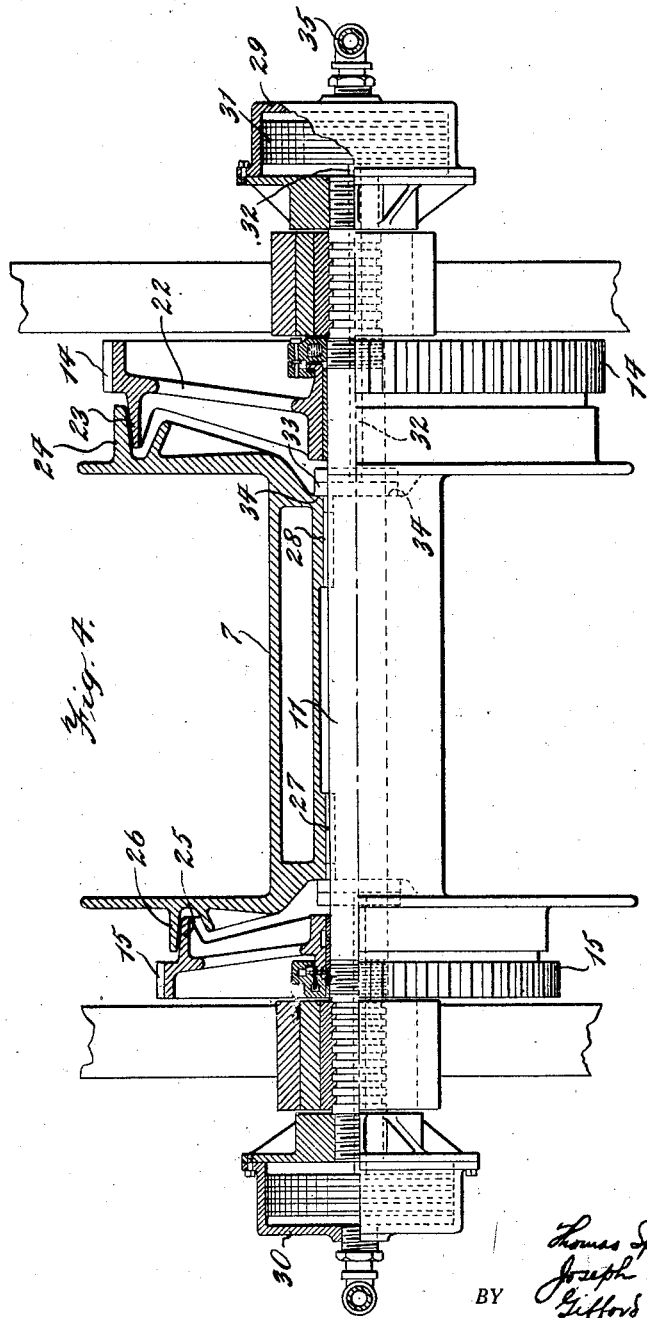
INVENTORS.
Thomas Spencer Miller
Joseph H. Dickinson
BY Gifford Bull & Scull
ATTORNEYS.

Patented May 18, 1926.

1,585,162

UNITED STATES PATENT OFFICE.

THOMAS SPENCER MILLER, OF SOUTH ORANGE, AND JOSEPH H. DICKINSON, OF MONTCLAIR, NEW JERSEY.

HOISTING AND CONVEYING DEVICE.

Application filed August 10, 1922. Serial No. 580,837.

Our invention relates to apparatus for hoisting and conveying, and particularly to apparatus for skidding logs.

In skidding logs by the overhead interlocking cableway system, many difficulties are encountered. One of the principal difficulties results from the varying effective diameters of the drums carrying the inhaul or skidding cable and the outhaul cable. This difficulty becomes greater as the length of span increases, on account of the increased amount of cables employed.

Our invention is directed particularly to apparatus for overcoming the above-mentioned difficulty, although it is by no means limited thereto, as our invention has many advantages which will be pointed out after the invention is better understood by reading the following description taken in connection with the accompanying drawings showing one embodiment of our invention, and in which—

Figure 1 is a plan view of an engine embodying our invention;

Fig. 2 is a side elevation of the device shown in Fig. 1, as viewed from the right side;

Fig. 3 is a partial section on line III—III of Fig. 1;

Fig. 4 is a partial longitudinal section of the skidding drum on line IV—IV of Fig. 1, with the friction operating cylinders added, and Fig. 5 is a schematic section on line V—V of Fig. 3.

Referring to the drawings, the device comprises a base or foundation, composed of channel members 1 and cross members 2, of any desired size and construction. Mounted on the base is a boiler 3 with which are connected cylinders 4 provided with pistons and connecting rods 5 of the usual construction.

Four drums 6, 7, 8 and 9 are mounted on the base, the said drums being carried by shafts 10, 11, 12 and 13, respectively.

Gears 14 and 15 are loosely mounted on the shaft 11, and gears 16 and 17 are loosely mounted on the shaft 12. The gears 14 and 16 mesh with each other. The crank-shaft 18 carries three gears 19, 20 and 21. The gear 19 meshes with the gear 17 and gear 20 meshes with gear 15. Gear 21 meshes with gear 16. The gears 19, 20 and 21 are keyed to the crank-shaft 18.

The drums are provided with friction devices of the type shown in Fig. 4. These frictions are well-known in the art and a detailed description thereof is therefore unnecessary. By reference to Fig. 4, however, it will be seen that one part 22 of the friction rotates with gear 14 and is provided with a friction surface 23 which is adapted to engage a corresponding friction surface 24 carried by the drum 7. Similarly, the gear 15 carries a friction surface 25 which engages a similar friction surface 26 on the drum 7. The drum 7 is illustrated as feathered to the shaft 11 by the feather keys 27 and 28, although it will be understood that the drum may, if desired, be loosely mounted on the shaft. The drum 7 may be moved into operative relation with either of the gears 14 or 15 by means of the steam cylinders 29 and 30, respectively. These two cylinders are identical, and, therefore, a description of one will be sufficient for both. The cylinder 29 is provided with a piston 31 which operates a rod 32, the inner end of which engages member 33 which is carried in a slot in the shaft 11. The ends of the member 33 engage a shoulder 34 on the drum 7. By admitting steam to the cylinder 29 through a pipe 35, the piston is moved to the left and acts through the rod 32 to move the drum 7 to the left, thus bringing the friction surfaces 25 and 26 into operative relation to each other, and thereby effectively connecting the gear 15 with the drum 7. By similarly operating the piston of the cylinder 30, the drum may be operatively connected to the gear 14. All of the shafts are suitably supported in bearings positioned in bearing blocks carried by the base 1. The drum 8 may likewise be clutched to either of the gears 16 or 17 by means of the cylinders illustrated in Figure 1, (and the pistons therein not illustrated).

The shaft 10 carries a gear 36 which meshes with the gear 14, and the shaft 13 carries a gear 37 which meshes with the gear 17.

The gears above described remain in mesh and are continuously rotated by the crank-shaft 18.

When the drums 7 and 8 are connected with the gears 14 and 16, respectively, the drums rotate in opposite directions and at a speed ratio dependent upon the number of teeth in the gears 14 and 16. When the drums 7 and 8 are connected with the gears 14 and 17, respectively, they continue to rotate in opposite directions and at a speed dependent upon the relative number of teeth in the gears 21, 16, 14, 19 and 17. The apparatus is so designed, that with any given speed of the crank-shaft the speed of the skidding drum 8 relative to the speed of the drum 7 is lower when the drums are connected with the gears 14 and 16, respectively, than when the drums are connected with the gears 14 and 17, respectively. By this arrangement, it will be observed that means are provided whereby a plurality of speed ratios between the drums 7 and 8 may be secured.

The drum 7 is the outhaul drum and carries the outhaul cable 38, and the drum 8 is the skidding drum and carries the skidding cable 39. The function and operation of the cables 38 and 39 are well understood, and, therefore, need not be set forth. The drum 6 carries the heel block cable 40, and the drum 9 carries the slack-pulling cable 41. The functions of these cables are likewise well understood by those skilled in the art.

When the drum 7 is connected with the gear 15, the outhaul cable is pulled in and the trolley which is mounted on the permanent cableway is carried toward the tail mast, and, as the diameter of the gear 20 is greater than that of gear 21, and diameter of gear 15 is less than that of gear 14, as illustrated, the carriage is drawn toward the tail mast at a greater speed than when it is hauled in towards the head mast. During this operation the skidding drum 8 is disconnected from both gears 16 and 17, so that the skidding cable may be carried out with the trolley in the usual way.

In operating overhead interlocking cableway systems, the effective diameters of the outhaul and the inhaul or skidding drums vary, dependent upon the amount of cable on the drums. This is due to the winding and unwinding of the cables on these drums. As these diameters vary, the load which is carried by the skidding cable first falls and then rises as it comes in from the tail mast. The load falls until the diameter of the skidding drum is such as to give to the skidding cable a linear speed equal to that of the outhaul cable. As the load is further moved toward the head mast, the speed of the skidding cable gradually becomes greater than that of the outhaul cable, whereupon the load begins to rise. This tendency of the load to rise and fall has been overcome in systems of this kind heretofore by slipping the frictions, or by stopping at intervals and either raising the load by operating the skidding cable while holding the outhaul cable stationary, or by lowering the load by holding the skidding cable stationary and paying out on the outhaul cable. The slipping of the frictions produces great wear and tear, and greatly shortens the life of the frictions; furthermore, when the skidding drum friction is allowed to slip, the speed of travel of the load along the main cableway is greatly decreased, thus consuming considerable extra time in the bringing in of the load. When the drum is stopped and the load raised or lowered, as the case may be, considerable extra time is also consumed in the bringing in of the load. By the use of our invention, the foregoing difficulties are entirely overcome, and, in addition, many advantages are secured. Among these advantages may be mentioned the following:

The periodic stopping and lifting of the load as it is brought in is entirely avoided; the constant slipping of the frictions on the skidding and outhaul drums is avoided or greatly reduced; a higher average skidding rope speed is secured, thus shortening the time necessary to bring in the load; a higher skidding rope speed at the beginning of operations on a long span is secured; by using the low gear greater power is available with a given size of engine for skidding in large logs or large bundles of smaller logs; by properly proportioning the speed ratios, so that with one set of gears in mesh the load will rise throughout the length of the span, and so that with the other set of gears in mesh the load will fall throughout the length of the span, the operator may maintain his load at any desired elevation by merely shifting from one speed to another without stopping the system to raise or lower the load; with a given engine a much greater speed variation on the cables may be secured without too great a variation of engine piston speed; by having a large pinion on the crank-shaft, a large gear may be used to operate the slack-pulling drum. This enables us to use a large friction and also gives the desirable high speed to the slack-pulling cable. Many other advantages will be apparent to those skilled in the art.

While we have shown and described one embodiment of our invention, we desire it to be understood that we are not limited to the exact arrangement shown and described, as many changes may be made in the details thereof without departing from the spirit of our invention.

We claim:—

1. In an engine of the character described the combination of a frame, two shafts extending across the frame, a drum slidably mounted on each shaft, a gear loosely mounted on each shaft at each end of each drum, the adjacent gears being constantly connected together and operating at a fixed ratio, the ratios of the gears at the ends of the drums being different and means for moving the drums on their shafts to connect them to the trains of gears and thereby rotate the drums at different ratios.

2. In an engine of the character described the combination of a frame, two shafts extending across said frame and arranged parallel to each other, a drum keyed on each shaft so as to rotate therewith but movable longitudinally thereof, a gear loosely mounted on each shaft at each end of each drum, the adjacent gears at one end of the drums being in mesh, driving gears interposed between the adjacent gears at the other ends of the drums, a gear driving the first named adjacent gears, said driving gears being so arranged as to drive the adjacent sets of gears at different rates of speed and means for moving said drums into operative relation with the gears whereby the drums are rotated at different speeds and at different speed ratios relative to each other.

3. In an engine of the character described, the combination of two drums axially movable with respect to the shafts on which they are mounted, two trains of gears each permanently connected together at different speed ratios and comprising a clutch gear located adjacent each end of each drum, and means for moving either of said drums axially into engagement with either of said gears whereby said drums may be rotated at different speed ratios, the parts being constructed and arranged to cause said drums to rotate in opposite directions.

4. In an engine of the character described, two drums each axially movable, meshing clutch gears mounted at one end of each of the drums, a drive shaft provided with a gear engaging one of said meshing gears whereby the clutch gears are rotated in opposite directions and at a predetermined speed ratio, clutch gears mounted adjacent to the opposite ends of said drums, gears mounted on said drive shaft engaging respectively the last two mentioned clutch gears, whereby said drums may be rotated in opposite directions and at different speeds by moving both drums into engagement with the first mentioned clutch gears or one of said drums into engagement with one of said first mentioned clutch gears and the other drum into engagement with one of the second mentioned clutch gears.

5. In a hoisting and conveying engine, a skidding drum and an outhaul drum each axially movable, meshing clutch gears mounted at one end of the drums, a drive shaft provided with a gear engaging one of said meshing gears whereby the clutch gears are rotated in opposite directions and at a predetermined speed ratio, clutch gears mounted adjacent to the opposite ends of said drums, gears mounted on said drive shaft engaging respectively the last two mentioned clutch gears, whereby said drums may be rotated in opposite directions and at different speeds by moving both drums axially into engagement with the first mentioned clutch gears, or said outhaul drum into engagement with one of said first mentioned clutch gears and the skidding drum into engagement with one of the second mentioned clutch gears.

THOMAS SPENCER MILLER.
JOSEPH H. DICKINSON.